United States Patent [19]

Wisbey et al.

[11] 4,099,855

[45] Jul. 11, 1978

[54] LIQUID CRYSTAL DISPLAY ARRANGEMENTS

[75] Inventors: Philip Henry Wisbey, Colchester; George Elliot, Sandon near Chelmsford, both of England

[73] Assignee: The Marconi Company Limited, England

[21] Appl. No.: 728,845

[22] Filed: Oct. 1, 1976

[30] Foreign Application Priority Data

Oct. 4, 1975 [GB] United Kingdom ............... 40696/75

[51] Int. Cl.² ................................................. G02F 1/13
[52] U.S. Cl. ..................... 350/333; 350/335; 340/324 M
[58] Field of Search ........................ 350/160 LC, 150

[56] References Cited

U.S. PATENT DOCUMENTS 3,731,986  5/1973  Ferguson .................. 350/160 LC X
3,881,808  5/1975  Gurtler et al. ................ 350/160 LC

OTHER PUBLICATIONS

Sato et al., "Liquid Crystal Color Display by DAP-TN Double Layered Structure," IEEE Transactions on Electron Devices, May, 1974, pp. 312–313.

Primary Examiner—Edward S. Bauer

[57] ABSTRACT

A liquid crystal display arrangement is provided with two liquid crystal cells containing twisted-nematic material, and positioned one cell behind the other. Both cells are between a pair of crossed polarizers, and the arrangement can be used to selectively reverse the contrast of a display or it can be used as a matrix display in which cross-talk between adjacent elements is minimized.

10 Claims, 2 Drawing Figures

LIQUID CRYSTAL DISPLAY ARRANGEMENTS

This invention relates to liquid crystal display arrangement and is specifically concerned with display arrangements using liquid crystal material of the twisted-nematic kind. The present invention seeks to provide an improved liquid crystal display arrangement of this kind.

According to this invention a liquid crystal display arrangement includes two planar liquid crystal cells placed one behind the other, both cells containing twisted-nematic liquid crystal material and being positioned between a pair of crossed polarisers.

Each cell is provided with electrodes by means of which an electric field can be applied to the liquid crystal material.

In one embodiment of the invention one cell is used to selectively reverse the contrast of a display pattern produced by the other cell.

In another embodiment of this invention, both cells are arranged as addressable matrix displays and are used in combination with each other to reduce the effect of cross-talk which can reduce the contrast obtainable in matrix displays.

Figure 1:
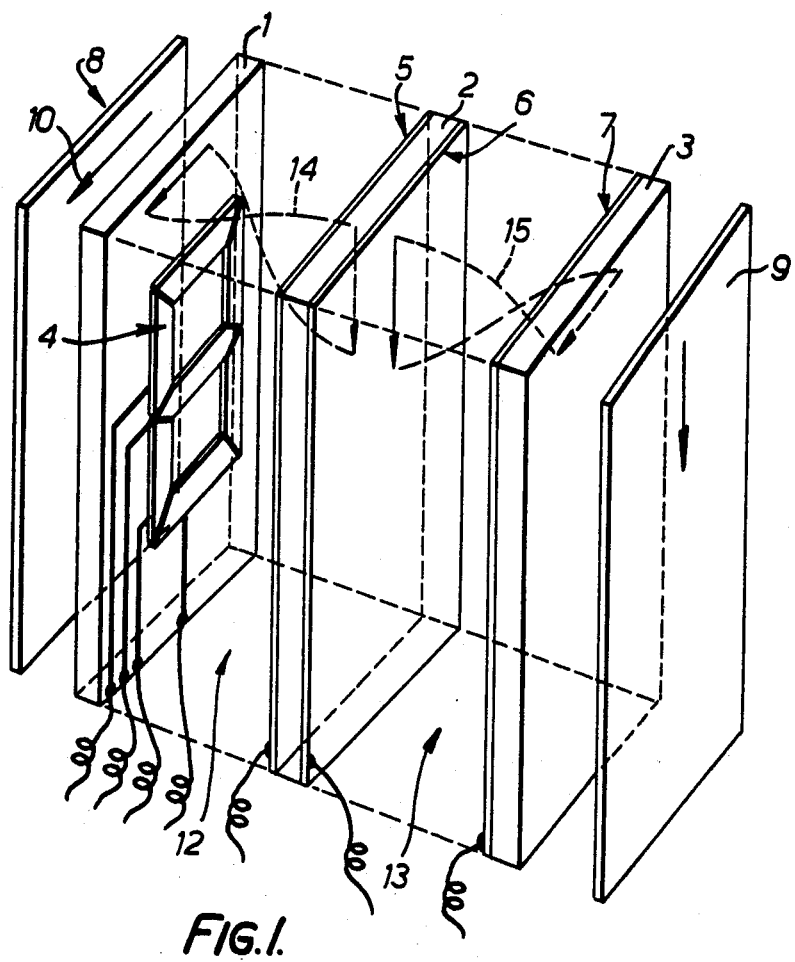
Figure 2:
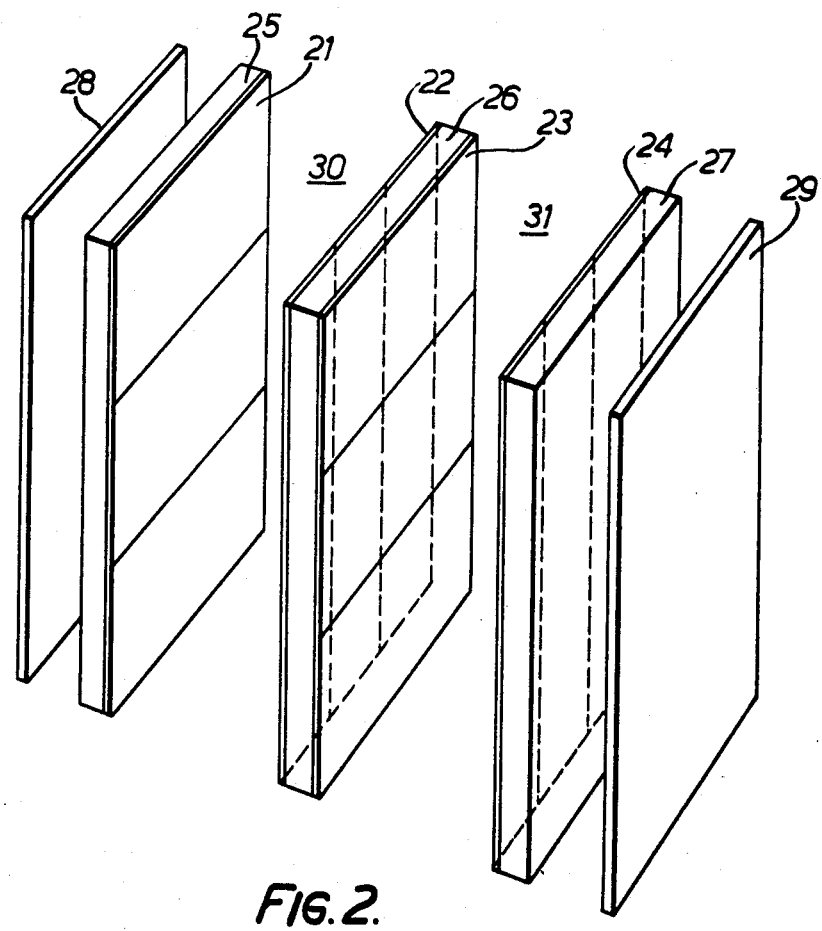

The invention is further described, by way of example, with reference to the accompanying drawings in which, FIG. 1 shows a liquid crystal display arrangement adapted to provide a selectable contrast reversal and FIG. 2 shows a liquid crystal display arrangement adapted to provide a matrix display.

Referring to FIG. 1, the display arrangement consists of three parallel glass plates 1, 2, 3 which are spaced apart to define two similarly dimensioned liquid crystal cells 12, 13 which contain twisted-nematic liquid crystal material. The surfaces of the glass plates which face the liquid crystal material are provided with electrodes 4, 5, 6 and 7. Electrodes 5, 6 and 7 are continuous, and can be provided by a conductive film of glass, or a thin transparent film of conductive metal. The remaining electrode 4 is in the shape of a seven-segment display character as shown. Each segment is provided with a separate electrical connection, and is electrically insulated from the other segments. In each case the molecular orientations of each pair of the electrodes are orthogonal, as is usual for a twisted-nematic display. Although not shown, the edges of the cells are sealed to prevent loss of the liquid crystal material.

The two liquid crystal cells contained by the three glass plates 1, 2, 3 are between a pair of crossed polarisers 8 and 9, the direction of polarisation being as represented by the arrows 10 and 11.

By applying a potential to selected segments of the electrode 4, and a different potential to electrode 5, various characters or symbols are produced. If no potential is applied to a twisted-nematic liquid crystal material, a 90° rotation of the plane of polarisation is produced in light passing through a cell. This rotation is indicated by the set of broken lines 14 and 15. Application of a suitable potential eliminates this rotation. Thus if a suitable potential is applied across the cell 13 between plates 2 and 3, light passing through polariser 8 and addressed areas of the cell 12 between plates 1 and 2 will not pass through polariser 8 and so a dark area is observed. Light passing through unaddressed areas of the cell 12 between plates 1 and 2 is rotated by 90°, and as no further rotation is produced by the cell 13 between plates 2 and 3, the light passes through the polariser 9, and is observed as a bright area. Consequentially a displayed character is observed as black on a white background.

By removing the potential between plates 2 and 3 a further rotation of 90° is achieved thereby, and a white character on a dark background is observed. This permits a complete contrast reversal to be achieved very easily.

Since the liquid crystal cells rotate by 90° any plane-polarised wave, but are themselves not polarisers, it is of no importance whether the electrodes 5 and 6 have parallel or orthogonal surface molecular originations, but they should be one or the other. The direction of rotation or twist also is not significant.

As illustrated, electrodes 5 and 6 are formed on opposite sides of the same glass plate 2, but this is not essential as, if desired, each cell can be quite separate, and could even be coupled together optically by, e.g. a lens system.

FIG. 2 shows an alternative embodiment of the present invention in which the use of two liquid crystal cells one behind the other is used to reduce the problem of cross-talk which can be experienced in addressing matrix displays.

The operation is explained with reference to a 3 × 3 matrix, although in practice matrices having many more rows and columns would be used. In FIG. 2 each electrode 21, 22, 23, 24 which is provided on a glass plate 25, 26, 27 consists of three parallel conductive stripes, arranged orthogonally relative to the other electrode of the particular cell. Each stripe is spaced apart slightly from its neighbouring stripes, so as to be electrically insulated therefrom. As before both cells are between crossed polarisers 28, 29.

Assuming that all unaddressed rows and columns are held at a reference potential e.g. earth, and, if $\phi(V)$ represents the rotation of polarisation introduced with an applied potential difference of V, the polarisation states of the matrix are as follows:

|  | 0 ↓ | +$V_c$ ↓ | 0 ↓ |
|---|---|---|---|
| 0→ | $\phi(0)$ | $\phi(|V_c|)$ | $\phi(0)$ |
| +$V_R$→ | $\phi(|V_R|)$ | $\phi(|V_c - V_R|)$ | $\phi(|V_R|)$ |
| 0→ | $\phi(0)$ | $\phi(|V_c|)$ | $\phi(0)$ |

If $|V_R| = |V_c| = |V|$, then for $V_R = +V_c$, the states are

| $\phi(0)$ | $\phi(V)$ | $\phi(0)$ |
|---|---|---|
| $\phi(V)$ | $\phi(0)$ | $\phi(V)$ |
| $\phi(0)$ | $\phi(V)$ | $\phi(0)$ | and for $V_R = -V_c$ the states are

| $\phi(0)$ | $\phi(V)$ | $\phi(0)$ |
|---|---|---|
| $\phi(V)$ | $\phi(2V)$ | $\phi(V)$ |
| $\phi(0)$ | $\phi(V)$ | $\phi(0)$ |

Normally $V_R + V_c$ will be a.c. (square or sine waves) so that the two states above apply respectively to $V_R$ in phase with $V_c$, and $V_R$ out of phase with $V_c$. The first case in which $V_R = +V_c$ is not normally regarded as useful for conventional displays since the addressed element has no net applied voltage.

In typical known display arrangements V is kept below the threshold voltage ($V_T$) of the twisted nematic liquid crystal material to prevent the 'cross' from appearing on the display when one activates the central addressed element. For liquid crystal displays this becomes extremely difficult for matrices of more than about 10 lines.

In FIG. 2, the two matrix arrays are superimposed, cell 30 of which has in phase addressing and the other cell 31 having out of phase addressing. Both are addressed at the same voltage level with the same address pattern. The resulting combined optical rotation of the two matrices is as shown below:

| $\phi_1(0) + \phi_2(0)$ | $\phi_1(V) + \phi_2(V)$ | $\phi_1(0) + \phi_2(0)$ |
| $\phi_1(V) + \phi_2(V)$ | $\phi_1(0) + \phi_2(2V)$ | $\phi_1(V) + \phi_2(V)$ |
| $\phi_1(0) + \phi_2(0)$ | $\phi_1(V) + \phi_2(V)$ | $\phi_1(0) + \phi_2(0)$ |

This gives three total rotation states:

$\Phi_0 = \phi_1(0) + \phi_2(0)$   non-select $\Phi_1 = \phi_1(V) + \phi_2(V)$   half-select $\Phi_2 = \phi_1(0) + \phi_2(2V)$   full-select To eliminate the appearance of cross-talk it is required that:

$\Phi_1 = \Phi_0 + n\pi$   where $n$ is an integer $\Phi_2 = \Phi_0 + (m+\frac{1}{2})\pi$   where $m$ is also preferably an integer Thus V should be much greater than $V_T$ so that $\phi(2V) \approx \phi(V)$, i.e. full saturation is achieved.

EXAMPLE (1)

If $\phi_1(0) = \phi_2(0) = 90°$ and $\phi_1(V) = \phi_2(V) \approx \phi_2(2V) \approx 0°$ then $\Phi_0 = 180°; \Phi_1 = 0°; \Phi_2 \approx 90°$ so that, if polariser and analyser are crossed, transmission will only occur for $\Phi_2$, i.e. total transmission will only occur for the selected element. If the polariser and analyser are uncrossed, only the selected element will give extinction.

EXAMPLE (2)

If $\phi_1(0) = 45°$ $\phi_2(0) = -45°$ $\phi_1(V) = \phi_2(V) \approx \phi_2(2V) \approx 0°$ then $\Phi_0 = 0°; \Phi_1 = 0°; \Phi_2 = 45°$ This system will thus behave similarly to Example (1), i.e. for polariser and analyser crossed at 90° the selected element transmits, and for polariser and analyser crossed at 45° the selected element extinguishes.

However, the transmission level is lower for Example (2) than for Example (1) since the polarisers are at 45°, but the contrast may be higher due to details of rotation properties of twisted nematic structure.

In the matrix operation each bit is displayed sequentially, and cross-talk is deliberately introduced into the matrix formed by each cell. The effect of the combined optical rotation properties of the two cells removes the cross-talk when viewed through the crosed polarisers.

We claim:

1. A liquid crystal display arrangement including two planar liquid crystal cells placed one behind the other, both cells containing twisted-nematic liquid crystal material and being positioned between a pair of crossed polarizers, and matrix means associated with each cell for addressing selected areas of the display arrangement, each said matrix means comprising discrete conductive stripes defining a row-column matrix, one matrix being adapted to have applied thereto row and column address voltages which are of relatively opposite polarities and the other matrix being adapted to have applied thereto row and column address voltages which are of the same polarities so that the optical rotations effected by the address voltages of the two cells at the cross talk areas thereof have a combined effect which is subsantially removed by the last polarizer.

2. A liquid crystal display arrangement as defined in claim 1 wherein said polarizers are crossed at 90°.

3. A liquid crystal display arrangement as defined in claim 1 wherein said polarizers are crossed at 45°.

4. A liquid crystal display arrangement as defined in claim 1 wherein said address voltages are much greater than the threshold voltage of said twisted nematic liquid crystal material.

5. A liquid crystal display arrangement as defined in claim 4 wherein said polarizers are crossed at 90°.

6. A liquid crystal display arrangement as defined in claim 4 wherein said polarizers are crossed at 45°.

7. The method of displaying a discrete area of a liquid crystal arrangement, which comprises the steps of:
 (a) providing a pair of planar liquid crystal cells one behind the other between a pair of crossed polarizers, each cell containing twisted nematic liquid crystal material and each cell having a row-column matrix of conductive stripes for address purposes;
 (b) addressing the matrix of one cell with row and column voltages having the same relative polarities; and
 (c) addressing the matrix of the other cell with row and column voltages having opposite relative polarities.

8. The method of claim 7 wherein said row and column voltages are of values much greater than the threshold voltage of said liquid crystal material.

9. The method of claim 8 wherein said polarizers are crossed at 90°.

10. The method of claim 8 wherein said polarizers are crossed at 45°.

* * * * *